United States Patent
Wang

(10) Patent No.: US 7,583,068 B2
(45) Date of Patent: Sep. 1, 2009

(54) METHOD FOR DRIVING VOLTAGE-CONTROLLED DEVICES OR CURRENT-CONTROLLED DEVICES

(75) Inventor: Zhao Wang, Beijing (CN)

(73) Assignee: Vimicro Corporation, Beijing (CN)

( * ) Notice: Subject to any disclaimer, the term of this patent is extended or adjusted under 35 U.S.C. 154(b) by 175 days.

(21) Appl. No.: 11/837,474

(22) Filed: Aug. 10, 2007

(65) Prior Publication Data

US 2008/0042628 A1 Feb. 21, 2008

(30) Foreign Application Priority Data

Aug. 18, 2006 (CN) .................. 2006 1 0112455

(51) Int. Cl.
*G05F 1/575* (2006.01)
*G05F 1/618* (2006.01)
(52) U.S. Cl. ........................ 323/284; 323/285
(58) Field of Classification Search ................ 323/222, 323/223, 224, 282, 284, 285, 351
See application file for complete search history.

(56) References Cited

U.S. PATENT DOCUMENTS 5,781,000 A * 7/1998 Saeki et al. ................ 323/234
6,538,417 B2 * 3/2003 Marty et al. ................ 323/282
7,091,705 B2 * 8/2006 Hoshino et al. ............. 323/222
7,453,251 B1 * 11/2008 Mehas et al. ................ 323/299

* cited by examiner

Primary Examiner—Gary L Laxton
(74) Attorney, Agent, or Firm—Joe Zheng

(57) ABSTRACT

A multifunctional driver controller capable to drive one or more voltage-controlled devices or current-controlled devices is described. The multifunctional driver controller comprises a selection unit receiving a control signal, one of a first reference voltage and a second reference voltage, the selection unit selecting either one of the first reference voltage and the second reference voltage per the control signal, and a control circuit receiving a reference voltage from the selection unit and a feedback signal from a load being driven by a controlled analog signal from the control circuits. The controlled analog signal is either a controlled voltage signal or a controlled current signal, the control circuit compares the reference voltage with the feedback signal and adjusts the controlled analog signal in reference to a difference between the reference voltage and the feedback signal until the feedback signal converges to the reference voltage.

8 Claims, 4 Drawing Sheets

METHOD FOR DRIVING VOLTAGE-CONTROLLED DEVICES OR CURRENT-CONTROLLED DEVICES

BACKGROUND OF THE INVENTION

1. Field of the Invention

The present invention is related to the area of circuits, in particular, related to multifunctional driver controllers that, in one aspect, are capable of controlling both current-controlled device and voltage-controlled devices.

2. Description of Related Art

WLED (White Light-Emitting Diode) and OLED (Organic Light Emitting Diode) are being widely used for illuminating. It is commonly known that a current going through a WLED controls the brightness of the emitting light from a WLED, however OLED brightness is controlled by the voltage applied across. Thus, WLED controller and OLED controller are quite different from each other. A WLED controller requires a low reference voltage, such as 100-300 mV, while an OLED controller requires a high reference voltage, such as 1.23V. A WLED controlled by an OLED controller would lead to high power consumption while an OLED controlled by a WLED controller would cause considerable problems.

The markets and applications for WLED and OLED are huge. There is a need for techniques that could perfectly control both WLED and OLED.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to multifunctional driver controller capable to drive one or more voltage-controlled devices or current-controlled devices. According to one aspect of the present invention, a multifunctional driver controller comprises a selection unit receiving a control signal, one of a first reference voltage and a second reference voltage, the selection unit selecting either one of the first reference voltage and the second reference voltage per the control signal, and a control circuit receiving a reference voltage from the selection unit and a feedback signal from a load being driven by a controlled analog signal from the control circuit, wherein the controlled analog signal is either a controlled voltage signal or a controlled current signal, the control circuit compares the reference voltage with the feedback signal and adjusts the controlled analog signal in reference to a difference between the reference voltage and the feedback signal until the feedback signal converges to the reference voltage.

The present invention may be implemented in a discrete or integrated circuit. According to one embodiment, the present invention is a method for a voltage-controlled device or a current-controlled device, the method comprises receiving a control signal to select one of a first reference voltage and a second reference voltage as a reference voltage; comparing the reference voltage with a feedback signal; adjusting a controlled analog signal in reference to a difference between the reference voltage and the feedback signal until the feedback signal converges to the reference voltage; providing the controlled analog signal appropriate to drive the current-controlled device when the control is set a first state; providing the controlled analog signal appropriate to drive the voltage-controlled device when the control is set a second state, wherein the feedback signal is obtained from a load being driven by the controlled analog signal, the load being either one of the voltage-controlled device or the current-controlled device.

One of the objects, features, and advantages of the present invention is to provide a driver controller capable to drive one or more voltage-controlled devices or current-controlled devices.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 1:
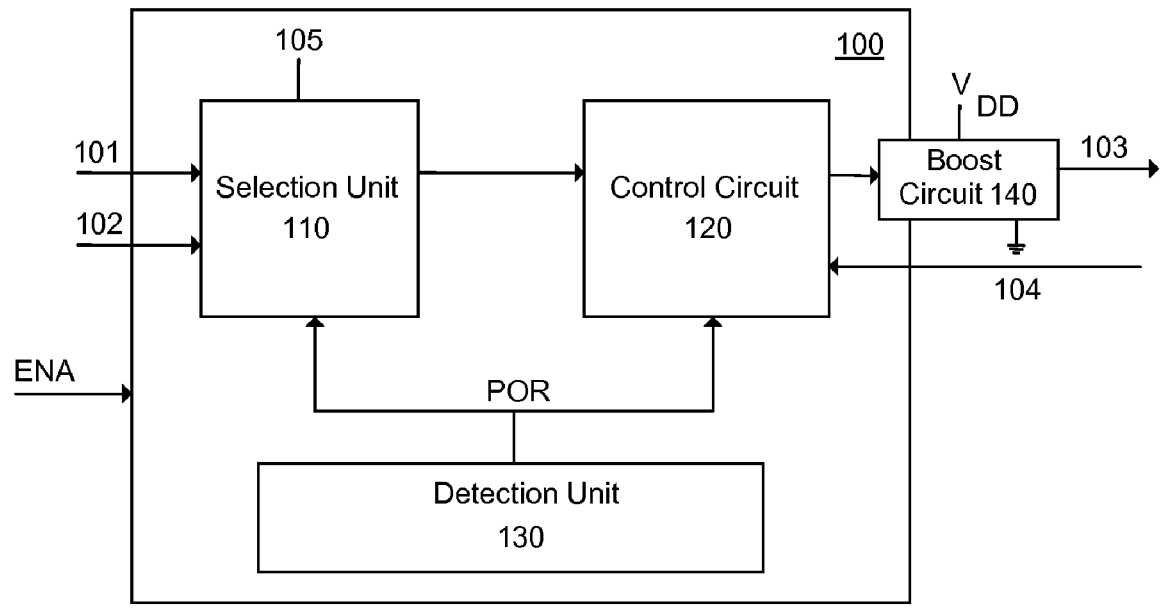
FIG. 1 shows a functional block diagram of a multifunctional driver controller according to one embodiment of the present invention.

The present invention discloses designs of multifunctional driver controllers. According to one aspect of the present invention, one embodiment of the driver controller can be advantageously used to control either an LED (e.g., WLED) or an OLED. FIG. 1 shows a functional block diagram of the multifunctional driver controller 100 according to one embodiment of the present invention. The multifunctional driver 100 comprises a selection unit 110, a control circuit 120 and detection unit 130.

The selection unit 110 is coupled to a control signal 105, a first reference voltage 101 and a second reference voltage 102. The selection unit 110 selects either the first reference voltage 101 or the second reference voltage 102 per the control signal 105. In one embodiment the first reference voltage is a low reference voltage and the second reference voltage is a high reference voltage. The selection unit further is coupled to a reset signal (not shown).

The control circuit 120 is coupled to the selection unit 110 for receiving the selected reference voltage, and a voltage input and a ground which are not shown. A controlled signal output 103 outputs a controlled analog signal that may be either a controlled voltage signal or a controlled current signal. A feedback signal 104 is provided to the control circuit 120. In operation, the control circuit 120 compares the selected reference voltage with the feedback signal and adjusts the controlled analog signal in reference to the comparison result until the feedback signal converge to the selected reference voltage. Thus the controlled analog signal is converged to a benchmark counterpart to the selected reference voltage. The control circuit 120 is further coupled to a reset signal (not shown).

The detection unit 130 is coupled to the selection unit 110 and the control circuit 120 with reset signals. The detection unit 130 is used to detect if the power has been applied to the controller 100. When such an event happens and proved to be valid, the detection unit 130 sends reset signals to the selection unit 110 and the controlling circuit 120 respectively.

As shown in FIG. 1, in one embodiment, the controller 100 is coupled to a boost circuit 140. The boost circuit 140 is provided between the controller 100 and a device to be driven. The purpose of the boost circuit 140, the name suggests, is to boost the controlled signal output from the controller 100. There are many ways to implement the boost circuit 140, which are known to those skilled in the art.

A different reference voltage could drive a different device. In one application, if a low reference voltage is selected by the selection unit 110, the control circuit 120 could be used to output a controlled current signal, and at the same time, the feedback signal could be a current feedback signal, thus the multifunctional driver controller 100 may be used to control a current-controlled device, such as WLED. For the selected voltage being a low reference voltage, the working voltage for a current-controlled device could be low, thus reducing power consumption.

In another application, if a high reference voltage is selected by the selection unit 110, the control circuit 120 could be used to output a controlled voltage signal, and at the same time, the feedback signal could be a voltage feedback signal, thus the multifunctional driver controller 100 may be used to control a voltage-controlled device, such as OLED. For the selected voltage being a high reference voltage, the controller 100 may well control the OLED and lead small errors. To facilitate the understanding of the present invention, the following description is based on controlling WLED and OLED. Those skilled in the art can appreciate that the present invention may be used to control many other current-controlled devices or voltage-controlled devices.

The controller 100 receives an enable signal. In one embodiment, the frequency of the enable signal is far below a clock frequency and far above what the human could recognize, therefore, controlling the enable signal frequency could also control the brightness of WLED or OLED.

Figure 2:
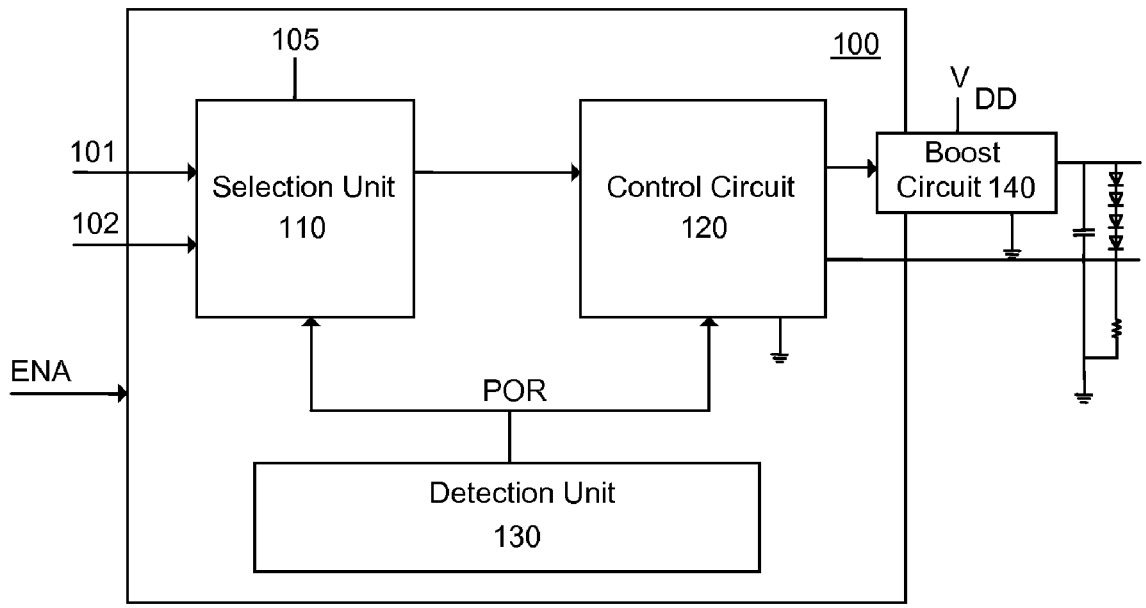
FIG. 2 shows the multifunctional driver controller acting as a LED driver.

As it shown in FIG. 2, the detection unit 130 and the control circuit 120 are coupled to a voltage source VDD. The controlled signal output 103 of the control circuit 120 is coupled to a boost circuit that includes an NMOS, an inductor L, a diode D and a capacitor C. The controlled signal output 103 is coupled to the gate of the NMOS and inductor L, diode D and capacitor C are coupled between VDD and the ground. The source of NMOS is coupled to the ground and the drop is coupled between the diode D and the capacitor C. A node voltage between inductor L and diode D is used as an output voltage Vout. The output voltage is coupled with one or more WLEDs and a feedback resistor R is coupled between the WLED and the ground. The voltage of feedback resistor R is the feedback signal and this voltage indicates the current flow through the WLED that is the controlled current signal. The first reference voltage of the selection unit 110 is a low reference voltage (e.g., 100 mV). The second reference voltage of selection unit 110 is a high reference voltage (e.g., 1.22V).

The selection unit 110 selects a low reference voltage as reference voltage. Comparing the feedback voltage and the low reference voltage, the control circuit 120 adjusts the controlled current signal in reference to the comparison result till the feedback voltage equal to the low reference voltage. Therefore, by adjusting the low reference voltage, it is possible to adjust the current flow through a WLED and then control its brightness.

Figure 3:
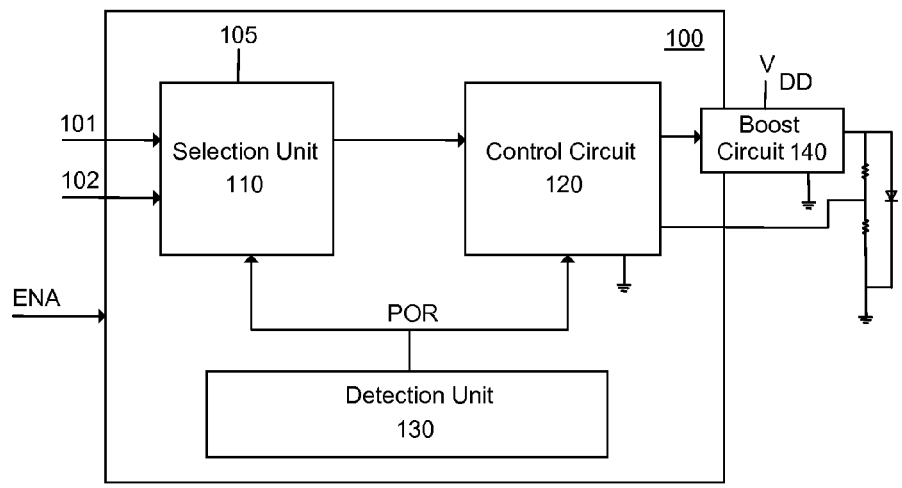
FIG. 3 shows the multifunctional driver controller acting as a WLED driver.

FIG. 3 is a block functional diagram of a multifunctional drive controller acting as an OLED driver. The OLED driver circuit looks similar to that for the WLED, and the differences are noted in the following. An OLED is coupled between Vout and ground and a voltage-division circuit is in parallel coupled to the OLED. The voltage-division circuit comprises two resistors Rvs1 and Rvs2 and the middle node voltage is the feedback voltage.

When driving OLED, the selection unit 110 selects a high reference voltage. Comparing the feedback voltage and the high reference voltage, the controlled current signal is adjusted in reference with the comparison result till the feedback voltage equal to the high reference voltage, thus adjusting the high reference voltage can control the voltage coupled to OLED and then control its brightness.

Figure 4:
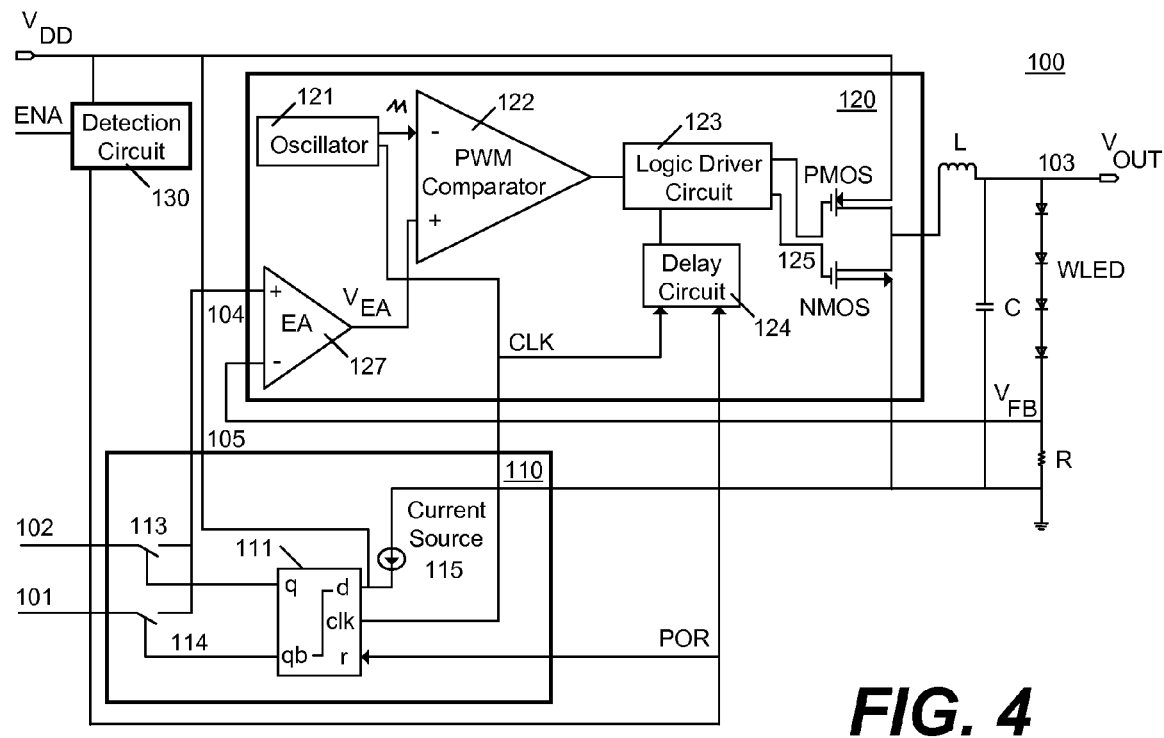
FIG. 4 shows an exemplary circuit diagram of one embodiment of the present invention to drive a number of LEDs.

Several methods could be used to realize the control circuit 120, FIG. 4 to FIG. 7 shows a detailed control circuit 120 in accordance with one embodiment of the present invention. As shown in FIG. 4, the control circuit 120 comprises an error amplifier 127, an oscillator 121, a PWM (Pulse Width Modulation) comparator 122, a logic driving unit 123, a delay circuit 124 and a power output switch 125.

The oscillator 121 is used to generate a triangle wave signal. The triangle wave signal is coupled to the negative input of the PWM comparator 122. In addition, the oscillator 121 also provides a clock signal to the selection unit 110 and the delay circuit 120.

The negative input of the error amplifier 127 is coupled to the feedback input of the multifunction driver 100 for receiving the controlled analog feedback signal. The positive input of the error amplifier 127 is a reference voltage input in the multifunction driver 100. The error amplifier 127 is used to compare the feedback signal and the reference voltage and amplify the difference (error) and subsequently output the error which is referred to as a voltage Vea.

Figure 8:
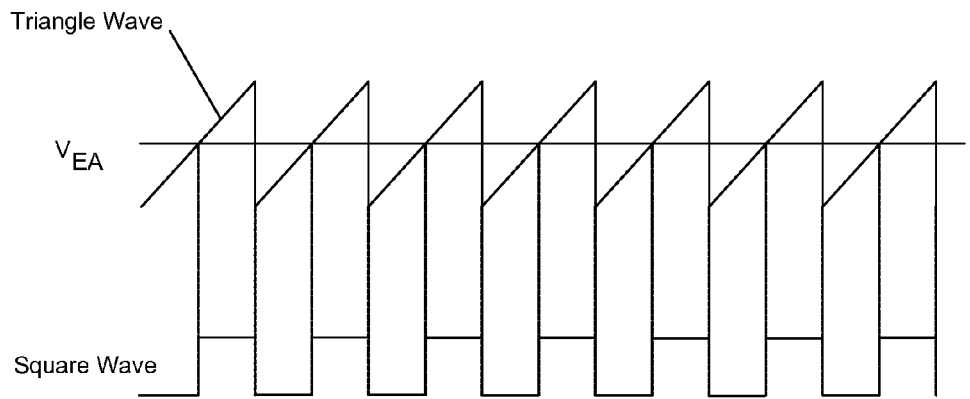
FIG. 8 is a square wave signal with a certain duty cycle diagram generated from a triangle signal.

The PWM comparator 122 is used to compare the triangle wave signal and the Vea, and output a square wave with a certain duty cycle. FIG. 8 shows the detailed working principle. When an electric potential of the triangle wave is higher than Vea, the PWM comparator 122 outputs a high, otherwise outputs a low. The square wave is sent to the logic unit 123.

The power output switch 125 includes a pair of PMOS and NMOS and their gates are coupled to the logic driving unit 123, their sources are coupled to the inductor L, the PMOS drop is coupled to Vdd while the NMOS drop is coupled to the ground.

The delay circuit 124 is provided to have accurate times by counting the triangle wave signal so as to provide an accurate delay of the square wave signal and to shut down the logic driving unit 123 during an unstable state at the beginning. It also has a reset to reset the control circuit 110. The logic driving unit 123 receives the square wave signal from the delay circuit 124 as a switch signal. As it shown in FIG. 4 to FIG. 7, when the square wave signal is high, it opens the NMOS, the node voltage between L and D is pulled to ground and LC releases energy and this is called a shutdown moment. When the square wave is low, it closes the NMOS, VDD charges the LC and this is called open moment. The square wave signal is also called a switch signal. The delay circuit 124 is used to assure that the logic driving unit generates a wrong signal during the unstable period. Therefore, judging Vea could adjust the square wave duty cycle to adjust the shutdown moment.

Figure 5:
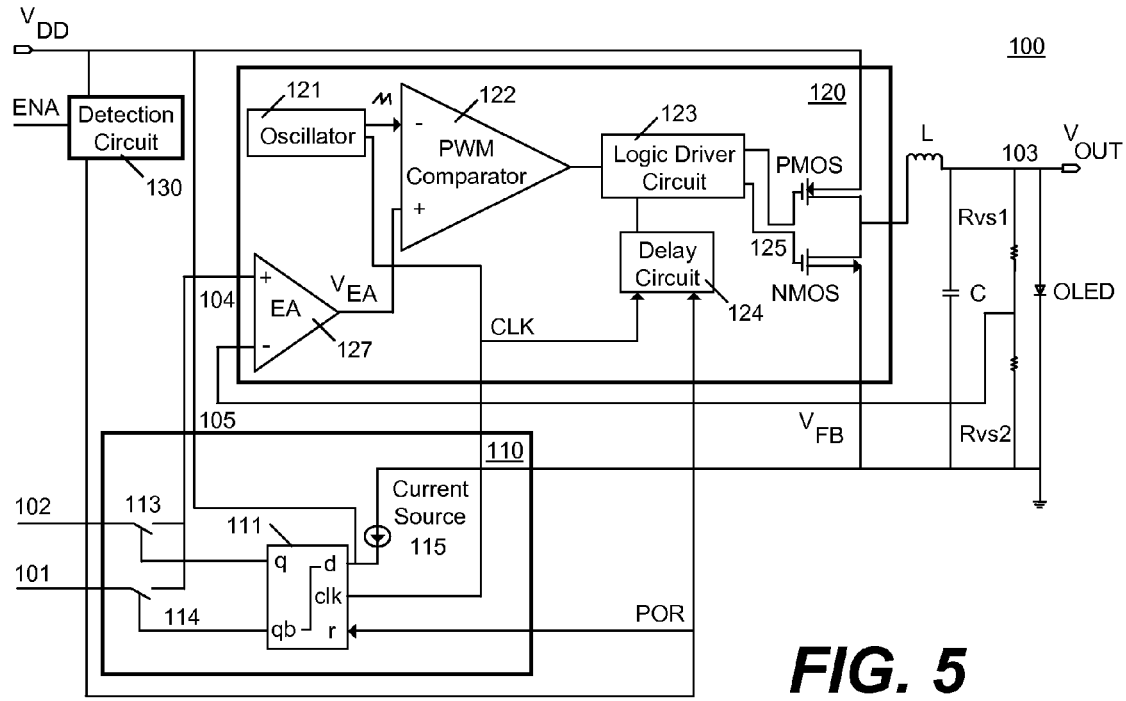
FIG. 5 shows an exemplary circuit diagram of one embodiment of the present invention to drive an OLED.
Figure 6:
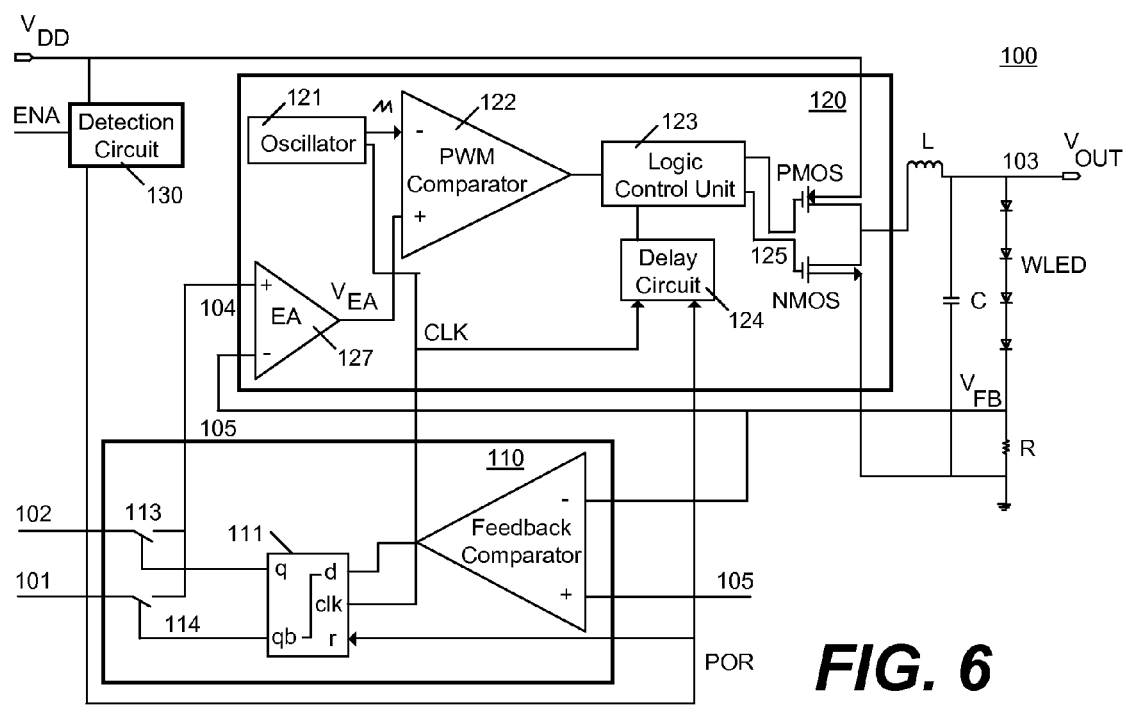
FIG. 6 shows another exemplary circuit diagram of one embodiment of the present invention to drive a number of LEDs.
Figure 7:
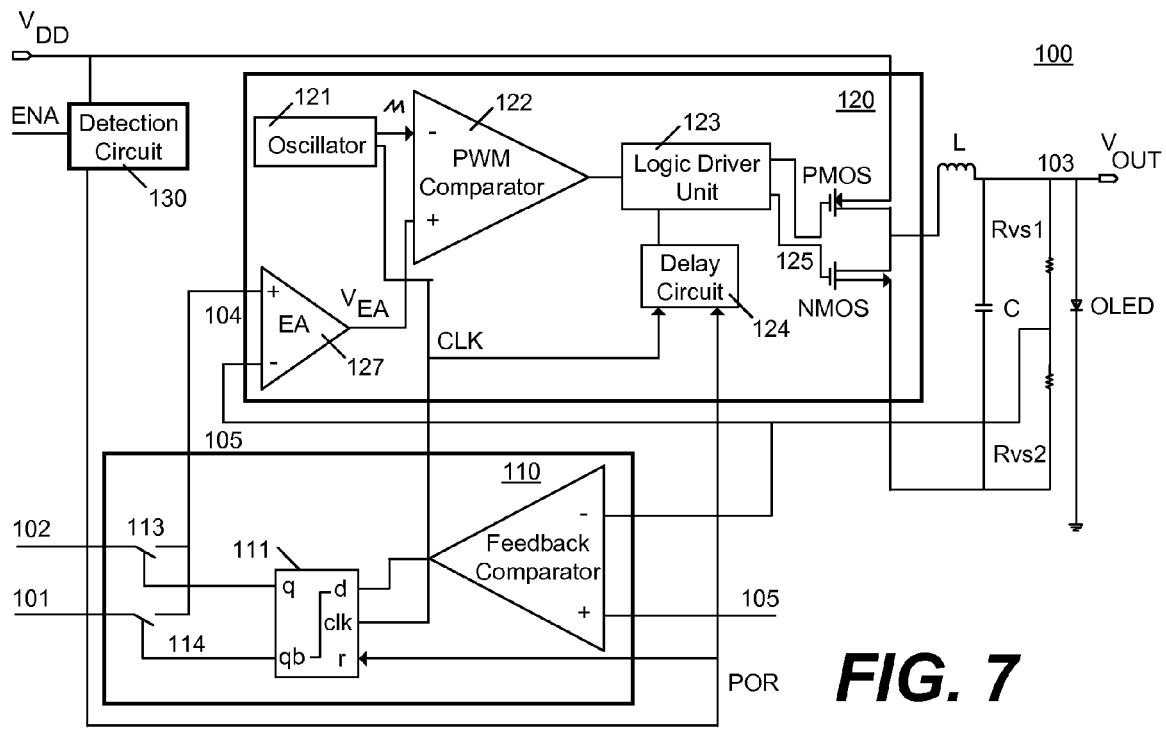
FIG. 7 shows another exemplary circuit diagram of one embodiment of the present invention to drive an OLED.

The selection unit 110 can also be realized using different circuits. FIG. 4 and FIG. 5 show a first one and FIG. 6 and FIG. 7 show a second one. The first embodiment selection unit 110 comprises a flip-flop 111, a current source 115, a first control switch 113, a second control switch 114 and a current source 115.

The first control switch 113 is used to control the first reference voltage provided to the selection unit 110 and the second control switch 114 is used to control the second reference voltage provided to the selection unit 110. Of cause the two switches 113 and 114 connect one reference voltage to the selection unit 110. The (D) flip-flop 111 has an input d, a clock input clk, a reset input r, a positive output q and a negative output qb. In one embodiment, the oscillator 121 provides a clock signal to the D flip-flop 111. The reset input r is the reset of the selection unit 110 and the reset signal is from the detection unit 130.

The flip-flop 111 latches data in d, sends the data to q and reverses the data to qb at the moment of a rising clock edge. The reset signal r is used to reset the D flip-flop. The q signal is used to control the first switch 111 and the qb signal is used to control the second switch 114. The current source is coupled between d and the ground and d is the control signal of the selection unit 110.

The d and VDD are coupled selectively under a control (e.g., a voltage control pin). When d is connected to VDD, the d is high, the q is high, the first control switch 113 is close and a low reference voltage is chosen, the qb is low, the second control switch 114 is open, the high reference voltage is abandoned. It is used to control a WLED as shown in FIG. 4. When the d is disconnected from VDD, the d is low, the q is low, the first control switch 113 is open and the low reference voltage is abandoned; the qb is high, the second control switch 114 is close, the high reference voltage is chosen. It is used to control an OLED as shown in FIG. 5.

For a logic state being unstable at the beginning, it is required to reset the required logic state. The detection unit 130 is used to reset the D flip-flop and the delay circuit. In one embodiment, the voltage pin to control the connection between d and VDD, and the voltage pin between the detection circuit and VDD could be combined together as a single voltage pin.

FIG. 6 and FIG. 7 show the second embodiment in which the selection unit 110 comprises a D flip-flop 111, a comparator 112, a first control switch 113, a second control switch 114 and a comparator. The first control switch 113, the second control switch 114 and D flip-flop are the same as in the first embodiment. The differences are that d is not connected to a current source but the output of the comparator 105. The positive input of the comparator is the input reference voltage and the negative input thereof is the control end of the selection unit 110 which is coupled to the feedback of control circuit 120.

As it shown in FIG. 7, when OLED is loaded, the feedback voltage 105 is a voltage-division voltage which is equal to Vout*Rvs2/(Rvs1+Rvs2), where Rvs1 and Rvs2 are the voltage division resistors. The feedback voltage will converge to a high reference voltage eventually. While in FIG. 6, when WLED is loaded, the feedback voltage 105 will converge to a low reference voltage in the end. The feedback voltage 105, when OLED is loaded, could be any voltage as long as there is no error.

The feedback voltage 105 in the multifunctional driver as shown in FIG. 7 is higher than the reference voltage, and the comparator 112 will output a low electric level, and the d in D flip-flop is low, q is low, the first switch is open, la ow reference voltage is abandoned and qb is high, the second switch is closed, and the high reference voltage is chosen.

The feedback voltage in the multifunctional driver as shown in FIG. 6 is lower than the reference voltage, and the comparator outputs a high electric level, and d in D flip-flop is high, q is high, the first switch is closed, a low reference voltage is chosen and qb is low, the second switch is open, and the high reference voltage is abandon. In the embodiments shown in FIG. 4 to FIG. 7, the D flip-flop is used to save a state, any other flip-flops, such as RS flip-flop, could be used to achieve the same goal.

The present invention introduces two different reference voltages so that different voltages will satisfy different designs. The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

I claim:

1. A method for a voltage-controlled device or a current-controlled device, the method comprising:
providing a selection unit to receive a control signal to select one of a first reference voltage and a second reference voltage as a reference voltage, the first reference voltage and the second reference voltage being either a low reference voltage or a high reference voltage;
providing a control circuit to compare the reference voltage with a feedback signal;
adjusting a controlled analog signal in reference to a difference between the reference voltage and the feedback signal until the feedback signal converges to the reference voltage, wherein the controlled analog signal being a square wave signal possesses a certain duty cycle, the feedback signal reflecting the duty cycle, the feedback signal and the reference voltage adjust the duty cycle till the feedback signal converges to the reference voltage and the duty cycle converges to a predefined reference mark;
providing the controlled analog signal appropriate to drive the current-controlled device when the control is set a first state;

providing the controlled analog signal appropriate to drive the voltage-controlled device when the control is set a second state;

wherein the feedback signal is obtained from a load being driven by the controlled analog signal, the load being either one of the voltage-controlled device or the current-controlled device; and when the power is detected to have been applied on, sending reset signals to the selection unit and the controlling circuit, respectively.

2. The method as claimed in claim 1, further comprising boosting the controlled analog signal in a boost circuit.

3. The method as claimed in claim 1, wherein the control circuit comprises:

an oscillator for generating a triangle wave signal;

an error amplifier amplifying a comparing result obtained by comparing the feedback signal and the reference signal;

a PWM comparator for generating a square wave signal with a certain duty cycle by comparing the triangle wave signal and an output from the error amplifier.

4. The method as claimed in claim 3, wherein the square wave signal is used to control a pair of NMOS and PMOS to control whether the controlled analog signal is appropriate to drive a voltage-controlled device or a current-controlled device.

5. The method as claimed in claim 4, wherein an OLED is coupled between the boost circuit and a ground, and a voltage-division circuit is in parallel coupled to the OLED, a voltage output node of the voltage-division circuit provides the feedback signal.

6. The method as claimed in claim 5, wherein the selection unit is caused to select the high reference voltage.

7. The method as claimed in claim 4, wherein a WLED and a resistor are in parallel coupled to the boost circuit and a ground; a voltage from a resistor R is the feedback signal.

8. The controller as claimed in claim 7, wherein the selection unit is caused to select the low reference voltage.

* * * * *